United States Patent [19]

Tanino et al.

[11] Patent Number: 4,798,415
[45] Date of Patent: Jan. 17, 1989

[54] DEVICE FOR ADJUSTING ELEVATIONAL POSITION OF HEAD REST

[75] Inventors: Masaharu Tanino, Toyota; Takemi Hattori, Anjo, both of Japan

[73] Assignees: Toyota Jidosha Kabushiki Kaisha; Aisen Seiki Kabushiki Kaisha, both of Japan

[21] Appl. No.: 146,185

[22] Filed: Jan. 20, 1988

[30] Foreign Application Priority Data

Jan. 26, 1987 [JP] Japan ................. 62-9506[U]

[51] Int. Cl.4 ............................................. A47C 1/10
[52] U.S. Cl. .................................... 297/410; 297/408
[58] Field of Search ............... 297/408, 409, 410, 403, 297/391

[56] References Cited

U.S. PATENT DOCUMENTS

| 2,828,810 | 4/1958 | Barecki et al. | 297/408 X |
| 3,547,486 | 12/1970 | Herzer et al. | 297/408 |
| 3,655,241 | 4/1972 | Herzer et al. | 297/408 |
| 4,256,341 | 3/1981 | Goldner et al. | 297/408 X |
| 4,351,563 | 9/1982 | Hattori | 297/391 X |
| 4,370,898 | 2/1983 | Maruyama | 297/408 X |
| 4,558,903 | 12/1985 | Takagi | 297/408 |
| 4,674,797 | 6/1987 | Tateyama | 297/408 |
| 4,678,232 | 7/1987 | Ishida et al. | 297/408 |

FOREIGN PATENT DOCUMENTS 2525040 12/1976 Fed. Rep. of Germany ...... 297/408
59-25258 2/1984 Japan .
60-167558 11/1985 Japan .

Primary Examiner—Kenneth J. Dorner
Assistant Examiner—Thomas A. Rendos
Attorney, Agent, or Firm—Parkhurst, Oliff & Berridge

[57] ABSTRACT

A device for adjusting the elevational position of a head rest of a seat for a vehicle having a stay formed with a plurality of grooves along an elevational direction and stood on a seat back of the seat, and a locking mechanism mounted in the shell of the head rest for engaging or disengaging the grooves of the stay by means of the lateral movements of the head rest comprising said stay having right and left vertical rods integrally coupled at the upper poritons thereof with the stay, a bracket member provided in the shell and coupled with the two vertical rods of the stay through two cylindrical supporting members inserted therethrough with the two vertical rods of the stay, a rod penetrated laterally through the shell and the bracket member to be secured to the shell but movably engaged with the bracket member in such a manner that the shell is urged to either leftward or rightward with respect to the bracket member with a gap formed at one side thereof, the grooves are formed at least one vertical rod of the stay, a locking plate formed in the vicinity of the bracket member and coupled with the rod to be engaged with any of the grooves of the vertical rod of the stay by means of urging, whereby the engaging distance of the locking plate with the groove is equal to or substantially smaller than the gap formed at one side thereof.

5 Claims, 4 Drawing Sheets

4,798,415

DEVICE FOR ADJUSTING ELEVATIONAL POSITION OF HEAD REST

BACKGROUND OF THE INVENTION

The present invention relates to a device for adjusting the elevational position of a head rest of a seat for a vehicle.

Japanese Utility Model Laid-open No. 167558/1985 discloses an example of a conventional device of this type. This device has a stay upstanding from a seat back, a guide shoe slidably engaged with the stay, a head rest body arranged on the guide shoe, and a locking mechanism arranged between the guide shoe and the stay for fastening the guide shoe to the stay at an arbitrarily elevational position.

Japanese Utility Model Laid-open No. 25258/84 discloses an example of a conventional device of other type. This device has a stay formed with a plurality of grooves along an elevational direction and upstanding on a seat back, and a locking mechanism disposed in the shell of the head rest and detachably attached to the grooves of the stay by the lateral rightward or leftward movement of the head rest.

In the device disclosed in Japanese Utility Model Laid-open No. 167558/1985, a lock releasing knob is disposed slightly lower position on the rear side of an occupant's shoulder, and two operations of releasing the lock by one hand and elevationally moving upward or downward the head rest by the other hand are required. When the head rest is adjusted elevationally upward or downward, the occupant must operate by both hands in front of the head rest. Thus, this device has a drawback that a driver has particularly a difficulty of operating the head rest during the driving operation of the vehicle.

In the device disclosed in Japanese Utility Model Laid-open No. 25258/1984, a driver can elevationally adjust the head rest even during the driving operation of the vehicle, but since only one stay is provided, it is difficult to stably move the head rest upward or downward. Further, this device has a drawback that groove rows must be formed at both sides of the stay.

SUMMARY OF THE INVENTION

Accordingly, an object of the present invention is to provide a device for adjusting the elevational position of a head rest by one hand.

Another object of the present invention is to provide a device for adjusting the elevational position of a head rest which can prevent a locking mechanism from being externally exposed as much as possible.

In order to achieve the above and other objects, there is provided according to the present invention a device for adjusting the elevational position of a head rest of a seat for a vehicle having a stay formed with a plurality of grooves along an elevational direction and upstanding on a seat back of the seat, and a locking mechanism mounted in the shell of the head rest for engaging or disengaging the grooves of the stay by means of the lateral movements of the head rest, said stay having right and left vertical rods integrally coupled at the upper portions thereof with the stay, a bracket member provided in the shell and coupled with the two vertical rods of the stay through two cylindrical supporting members inserted therethrough with the two vertical rods of the stay, a rod penetrated laterally through the shell and the bracket member to be secured to the shell but movably engaged with the bracket member in such a manner that the shell is urged to either leftward or rightward with respect to the bracket member with a gap formed at one side thereof, the grooves are formed at least one vertical rod of the stay, a locking plate formed in the vicinity of the bracket member and coupled with the rod to be engaged with any of the grooves of the vertical rod of the stay by means of urging, whereby the engaging distance of the locking plate with the groove is equal to or substantially smaller than the gap formed at one side thereof.

Thus, the head rest is coupled through the cylindrical supporting member to the stay made of right and left vertical rods to be moved elevationally by sliding the supporting member along the vertical rods of the stay.

Thus, the head rest is not fluctuated but elevationally moved in a stable attitude.

The head rest can be secured to a predetermined home position by engaging the locking plate with any of the grooves of one of the vertical rods of the stay.

In order to shift the head rest from a certain fixed position to other position, the head rest is pushed along the lateral directions of the head rest against the tension.

Thus, the shell of the head rest is slid together with the rod in the distance of the gap preset with respect to the bracket member. Since the rod is coupled with the locking plate, the locking plate is separated from the grooves of one of the vertical rods of the stay.

Then, the head rest is pushed elevationally upward or downward while pressing the head rest in the above-mentioned direction.

In this manner, the head rest is moved along the two vertical rods of the stay.

When the head rest is stopped at a desired position and the occupant's hand is separated from the head rest, the head rest is returned to the original position in the rightward or leftward direction by the tension, the locking plate is engaged with any of the grooves of one of the vertical rods of the stay, and fixed at its position.

Since the grooves of one of the vertical rods of the stay are formed in the vicinity of the bracket member and the locking plate is contained in the head rest, it can prevent the locking mechanism from being exposed to the exterior as much as possible, thereby improving the external appearance of the head rest.

BRIEF DESCRIPTION OF THE DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

Figure 1:
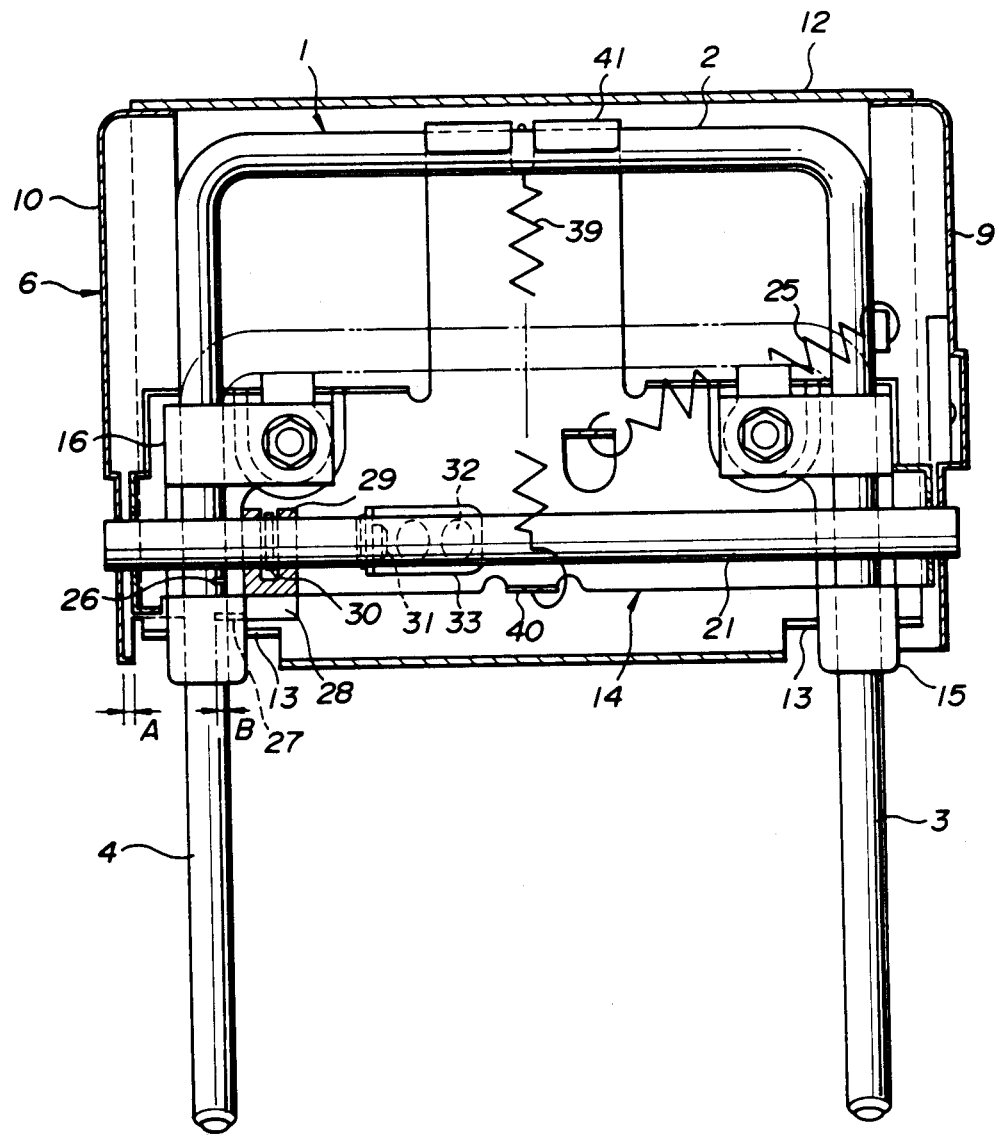
FIG. 1 is a vertical sectional view of a head rest containing an embodiment of a device for adjusting the elevational of a head rest according to the present invention.
Figure 2:
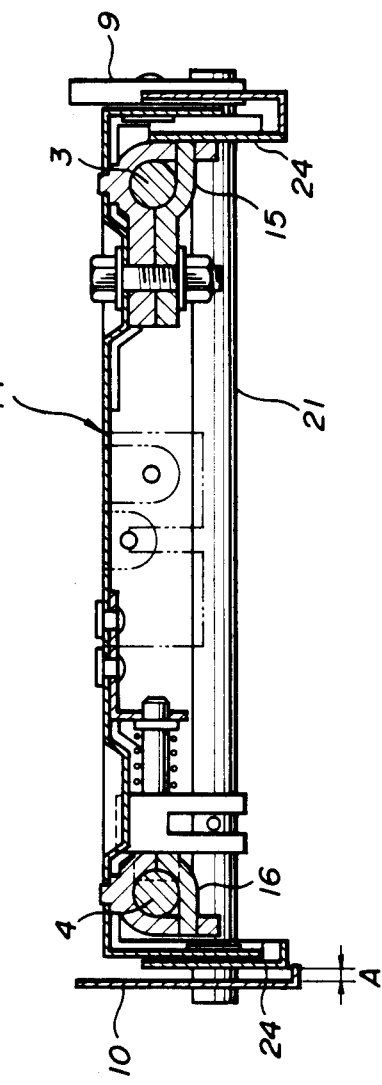
FIG. 2 is a horizontal sectional view of the vicinity of a bracket member of the device.

This invention will now be described in detail with reference to FIGS. 1 to 3, which show an embodiment of a device for adjusting the elevational position of a head rest of a seat for a vehicle according to this invention.

An embodiment of the present invention will be described by referring to FIGS. 1 to 4.

In the drawings, the device comprises a stay 1, which has left and right vertical rods 3 and 4 coupled integrally by a lateral rod 2 at the upper ends thereof in an inverted U shape.

Figure 3:
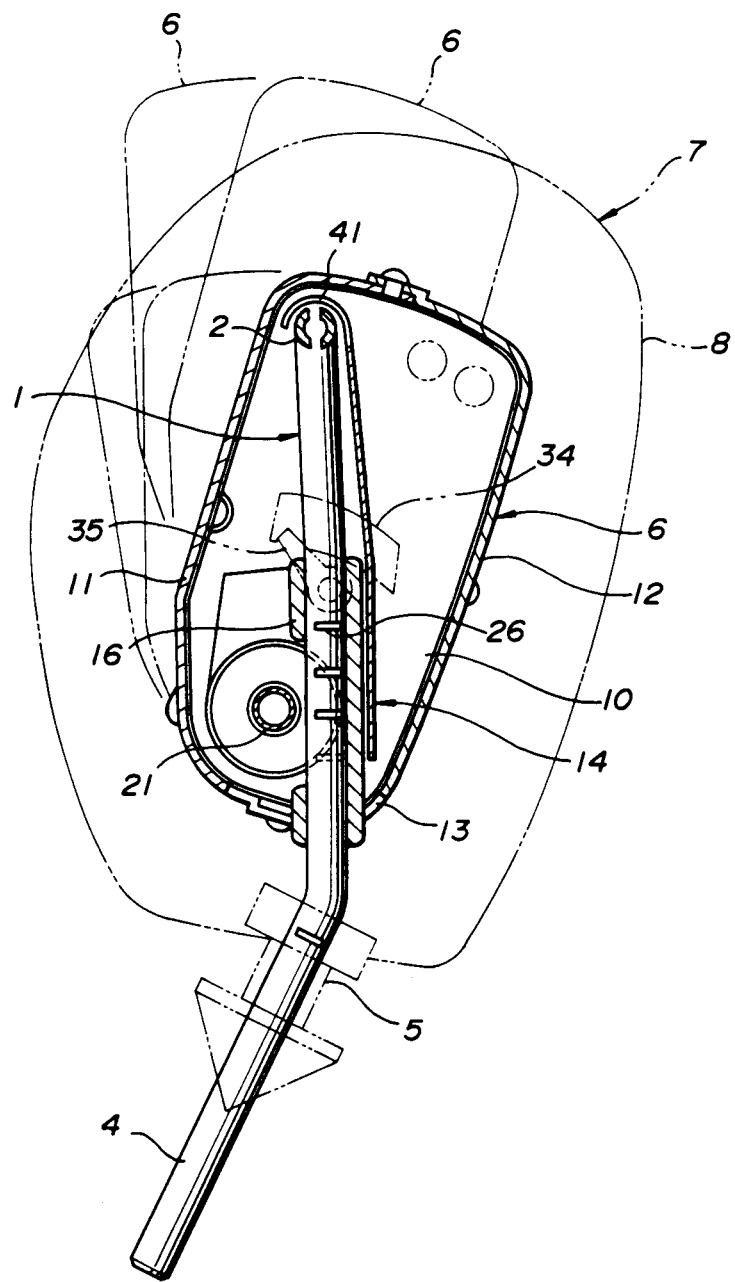
FIG. 3 is a vertical sectional view of the head rest.
Figure 4:
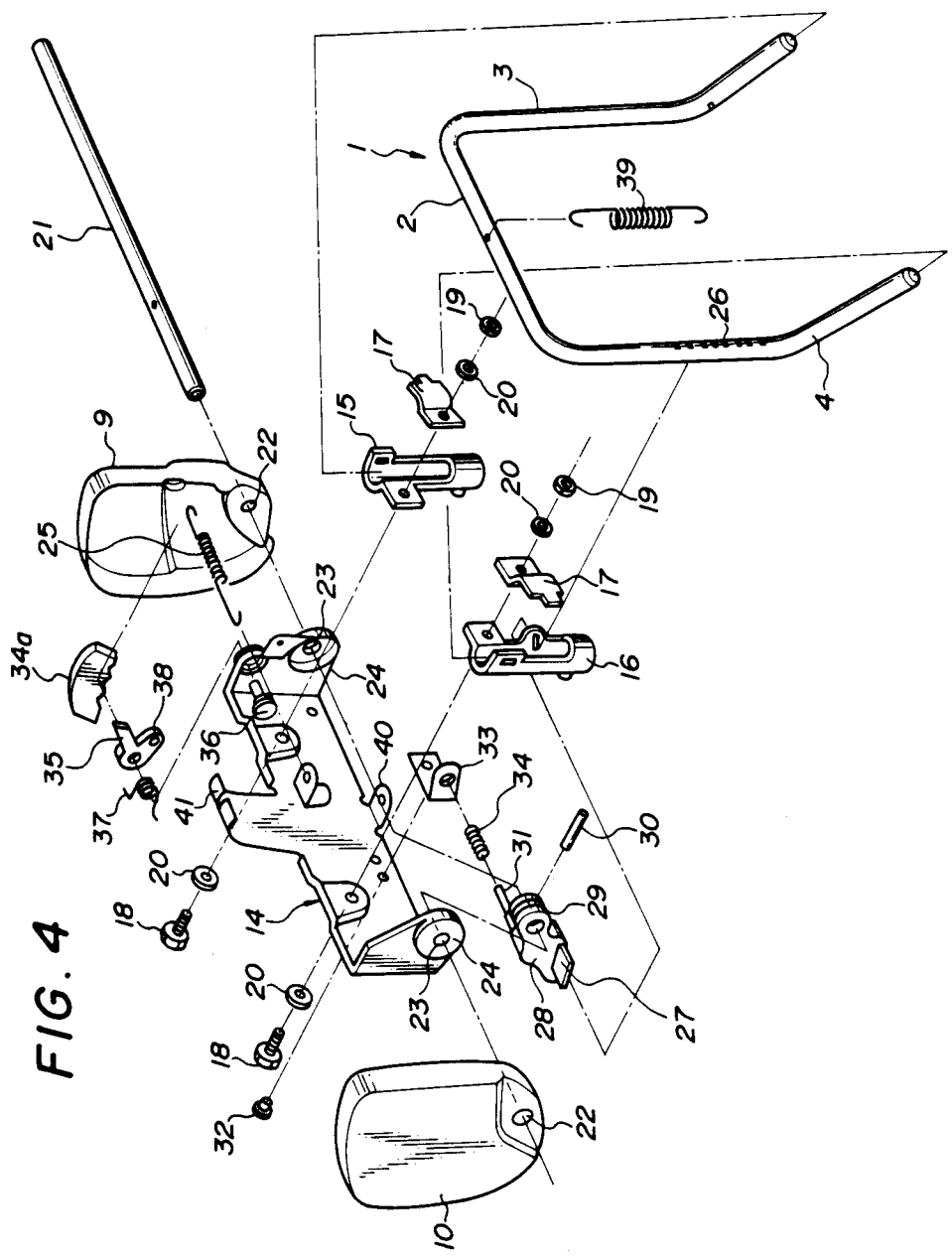
FIG. 4 is an exploded perspective view of the internal structure of the head rest.

The vertical rods 3 and 4 are fixedly secured at the upper portions thereof, as shown in FIG. 3, through fastening means 5 to the upper portion of a seat back.

The device also comprises a shell 6 of a head rest 7. The head rest 7 is composed of a pad material and a skin disposed around the shell 6 in a thickness of the degree as designated by dotted chain line 8 in FIG. 3 for providing a cushion at an occupant's head to be rested thereon.

The shell 6 is formed in a hollow pillow shape of left and right dish-like side portions 9 and 10, a front face portion 11 of curved plate shape and a rear face portion 12 in engagement with each other around the stay 1.

The upper lateral portion of the stay 1 is introduced in the shell 6, and openings 13 are formed at the lower opposed parts of the front and rear face portions 11 and 12 for passing the two vertical rods 3 and 4 of the stay 1.

A bracket member 14 is laterally inserted to extend in lateral direction through the shell 6, and coupled through left and right cylindrical supporting members 15 and 16 to the two vertical rods 3 and 4, respectively.

The supporting members 15 and 16 are so formed at their upper front portions as retainers 17 separated from the member bodies as to readily insert partly bent vertical rods 3 and 4, respectively.

The bracket member 14 is coupled to the vertical rods 3 and 4 by clamping the supporting members 15 and 16 by means of bolts 18, nuts 19 and washers 20.

Thus, the bracket member 14 can elevationally move upward or downward along the vertical rods 3 and 4 at both left and right sides while supporting the head rest 7.

A rod 21 is laterally penetrated through the shell 6 and the bracket member 14. The rod 21 is fixedly secured to the shell 6 but movably engaged with the bracket member 14.

The rod 21 is penetrated through the lower portion of the shell 6, engaging openings 22 are perforated at the lower sides of the side bracket members 9 and 10 of the shell 6 for passing the rod 21, and movably engaging openings 23 are perforated at the lower side parts of the side portions 24 of the bracket member 14.

Thus, the rod 21 is set at the lower portion of the shell 6 because the head rest 7 can be adjusted at its inclining angle forward or backward in the longitudinal direction as will be described later.

The left side portion 9 of the shell 6 is coupled through a tension coiled spring 25 to the bracket member 14.

Thus, the shell 6 is always urged laterally leftward or rightward with respect to the bracket member 14 by means of the tension coiled spring 25, the inside of the left side portion 9 of the shell 6 is contacted with the left end of the bracket member 14, and a gap A is formed between the inside of the right side portion 10 of the shell 6 and the left end of the bracket member 14.

The distance of the gap A between the right side portion 10 of the shell 6 and the bracket member 14 is preferably, in this embodiment, approx. 4 mm.

The tension of the coiled spring 25 is set to a value smaller than the force applied by occupant's one hand. When the leftward force is applied by occupant's one hand to the shell 6, the shell 6 is displaced leftward in the distance of the gap A with respect to the bracket member 14 and the stay 1.

Several grooves 26 are cut at an equal interval on the right side vertical rod 4. The grooves 26 are generally formed in the vicinity of the bracket member 14 on the vertical rod 4.

A block 28 for supporting a plate-like locking plate 27 is inserted to the rod 21.

A bearing 29 engaged with the rod 21 of the block 28 is forked, and a pin 30 to be inserted to the rod 21 is interposed between the forked portion of the bearing 29. A pin 31 which extends in the same direction as the rod 21 is provided on the block 28, and the pin 31 is inserted to a supporting bracket 33 clamped by a rivet 32 to the bracket member 14. A compression coiled spring 34 for eliminating a play is inserted to the pin 31.

Thus, the block 28 is always urged rightward on the rod 21, and the locking plate 27 is accordingly always urged to the side of the grooves 26 of the vertical rod 4.

The engaging amount B of the locking plate 27 with the grooves 26 of the vertical rod 4 is equal to or slightly smaller than the distance of the gap A between the shell 6 and the bracket member 14.

As described above, when the shell 6 is displaced leftward at the distance of the gap A, the locking plate 27 is separated from the grooves 26 of the vertical rod 4.

The shell 6 is held with respect to the bracket member 14 through the rod 21 and the upper portion in the shell 6 is formed with a cavity as shown in FIG. 3. Thus, the shell 6 is rotatable within a predetermined angular range at the axis of the rod 21 as a center.

In this manner, the head rest 7 is adjustable at the inclining angle by rotating forward or backward in the longitudinal direction.

Further, a ratchet 34a for adjusting the inclining angle of the head rest 7 is provided, and a pawl 35 is engaged with the teeth of the ratchet 34a.

The ratchet 34a is fixedly secured into the left side 9 of the shell 6, and the pawl 35 is supported by a pin 36 through a torsion spring 37 to the left end of the bracket member 14. The pawl 35 has an opening 38 formed thereat to which a knob (not shown) for disengaging the ratchet 34a is inserted.

The shell 6 is rotatably with respect to the bracket member 14 by way of the forked portion of the bearing 29 of the block 28.

The upper lateral rod 2 of the stay 1 is connected to the lower support 40 of the bracket member 14 by means of a tension coiled spring 39.

Thus, the head rest 7 is always urged upward together with the bracket member 14.

A stopper piece 41 is provided to restrict the lower limit of the head rest 7 in the downward direction.

The device for adjusting the elevational position of the head rest of the present invention is constructed as described above to cooperate the rightward and leftward movements of the head rest, the locking and unlocking operations of the locking mechanism. Thus, the occupant can adjust the elevational movements of the head rest by occupant's one hand without opposing in front of the head rest.

Further, the stay has two vertical rods at both sides to integrally couple the head rest with the vertical rods. Thus, the head rest can be smoothly moved upward or downward by occupant's one hand.

In addition, the grooves to be formed on the stay are formed at least one of the two vertical rods in one row on the inside of one vertical rod. Therefore, the manufacturing cost can be reduced.

Moreover, the grooves and the locking plate are concentrated in the vicinity of the bracket member within the head rest. Consequently, the head rest can prevent the locking mechanism from exposing in the exterior as much as possible, thereby improving the external appearance of the head rest.

What is claimed is:

1. A device for adjusting the elevational position of a head rest located on a seat back of a seat for a vehicle, said device comprising: a stay formed with a plurality of grooves along an elevational direction, and a locking mechanism mounted in a shell of the head rest for engaging or disengaging the grooves of the stay by means of lateral movements of the head rest, said stay having right and left vertical rods integrally coupled at the upper portions thereof to a lateral rod, a bracket member being provided in the shell and coupled with the two vertical rods of the stay through two cylindrical supporting members slidably supported on the two vertical rod of the stay, a rod penetrating laterally through the shell and the bracket member to b secured to the shell but movably engaged with the bracket member in such a manner that the shell is urged either leftward or rightward with respect to the bracket member with a gap formed at one side thereof, the grooves being formed in the vicinity of the bracket member on at least one vertical rod of the stay, a locking plate being formed in the vicinity of the bracket member and rotatably coupled with the rod to be urged toward engagement with any one of the grooves of the vertical rod of the stay, whereby an engaging distance between the locking plate and the groove is equal to or substantially smaller than the gap formed at one side thereof.

2. The device for adjusting the elevational position of a head rest for a seat according to claim 1, wherein said at least one vertical rod penetrates the lower portion of the shell, and a head rest inclining angle adjusting mechanism is provided in the upper portion in the shell.

3. The device for adjusting the elevational position of a head rest for a seat according to claim 1, wherein said locking plate is supported on a block, the block being slidably supported on the bracket member through a pin extending parallel to the rod and rotatably but nonslidably supported on the rod.

4. The device for adjusting the elevational position of a head rest for a seat according to claim 1, wherein said stay is coupled to the bracket member by means of a tension coiled spring, whereby the bracket member is always urged with respect to said stay.

5. A device for adjusting the elevational position of a head rest located on a seat back of a seat for a vehicle, said device comprising a stay formed with a plurality of grooves along an elevational direction and a locking mechanism mounted in a shell of the head rest for engaging or disengaging the grooves of the stay by means of lateral movements of the head rest, said stay having right and left vertical rods integrally coupled at the upper portions thereof to a lateral rod, a bracket member being provided in the sell and coupled with the two vertical rods of the stay through two cylindrical supporting members slidably supported on the vertical rods of the stay, a rod penetrating laterally through the shell and the bracket member to be secured to the shell but movably engaged with the bracket member in such a manner that the shell is urged either leftward or rightward with respect to the bracket member with a gap formed at one side thereof, the grooves being formed in the vicinity of the bracket member on at least one vertical rod of the stay, a locking plate being formed in the vicinity of the bracket member and rotatably coupled with the rod to be urged toward engagement with any one of the grooves of the vertical rod of the stay, whereby an engaging distance of the locking plate and the groove is equal to or substantially smaller than the gap formed at one side thereof; and said locking plate being support on a block, the block being slidably supported on the bracket member through a pin extending parallel to the rod and rotatably but nonslidably supported on the rod.

* * * * *